(12) United States Patent
Budde

(10) Patent No.: US 8,848,309 B2
(45) Date of Patent: Sep. 30, 2014

(54) DETERMINING HEAD-TO-DISK CONTACT AND/OR SPACING USING FREQUENCY DOMAIN SIGNATURE OF A TEMPERATURE SENSOR

(75) Inventor: Richard A. Budde, Plymouth, MN (US)

(73) Assignee: Seagate Technology LLC, Cupertino, CA (US)

( * ) Notice: Subject to any disclaimer, the term of this patent is extended or adjusted under 35 U.S.C. 154(b) by 36 days.

(21) Appl. No.: 13/544,559

(22) Filed: Jul. 9, 2012

(65) Prior Publication Data

US 2014/0009851 A1  Jan. 9, 2014

(51) Int. Cl.
*G11B 21/02* (2006.01)
*G11B 5/127* (2006.01)

(52) U.S. Cl.
USPC ............................................ 360/75; 360/110

(58) Field of Classification Search
None
See application file for complete search history.

(56) References Cited

U.S. PATENT DOCUMENTS

| 7,660,068 | B1 | 2/2010 | Baumgart et al. | |
| 8,125,728 | B2 * | 2/2012 | Kurita et al. | 360/75 |
| 2004/0240109 | A1 | 12/2004 | Hamann et al. | |
| 2008/0239581 | A1 | 10/2008 | Ikai et al. | |
| 2010/0225310 | A1 * | 9/2010 | Sudou | 324/213 |
| 2011/0235207 | A1 * | 9/2011 | Yang | 360/75 |

* cited by examiner

*Primary Examiner* — Andrew L Sniezek
(74) *Attorney, Agent, or Firm* — Hollingsworth Davis, LLC

(57) ABSTRACT

A high frequency, AC-modulated heater current is applied to a heater of a magnetic head. A resistance change of a temperature sensor located at a region of proximity to a magnetic media is determined. The resistance change occurs in response to the heater current. At least one of a spacing and contact between the magnetic head and the magnetic media is determined based on a frequency-domain signature of the resistance change.

18 Claims, 4 Drawing Sheets

DETERMINING HEAD-TO-DISK CONTACT AND/OR SPACING USING FREQUENCY DOMAIN SIGNATURE OF A TEMPERATURE SENSOR

SUMMARY

The present disclosure is directed to determining head-to-disk contact using frequency domain signature of a temperature sensor. In one embodiment, a high frequency, AC-modulated heater current is applied to a heater of a magnetic head. A resistance change of a temperature sensor located at a region of proximity to a magnetic media is determined. The resistance change occurs in response to the heater current. At least one of a spacing and contact between the magnetic head and the magnetic media is determined based on a frequency-domain signature of the resistance change.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to magnetic recording devices used for data storage. Data storage systems may include one or more recording heads that read and write information to a magnetic recording medium. It is often desirable to have a relatively small distance or spacing between a recording head and its associated media. This distance or spacing is referred to herein as "head-to-media spacing." By reducing the head-to-media spacing, a recording head may better be able to both write and read data to and from a medium. Reducing the head-to-media spacing also allows for surveying of recording medium topography, such as for detecting asperities and other features of the recording medium surface.

Figure 1:
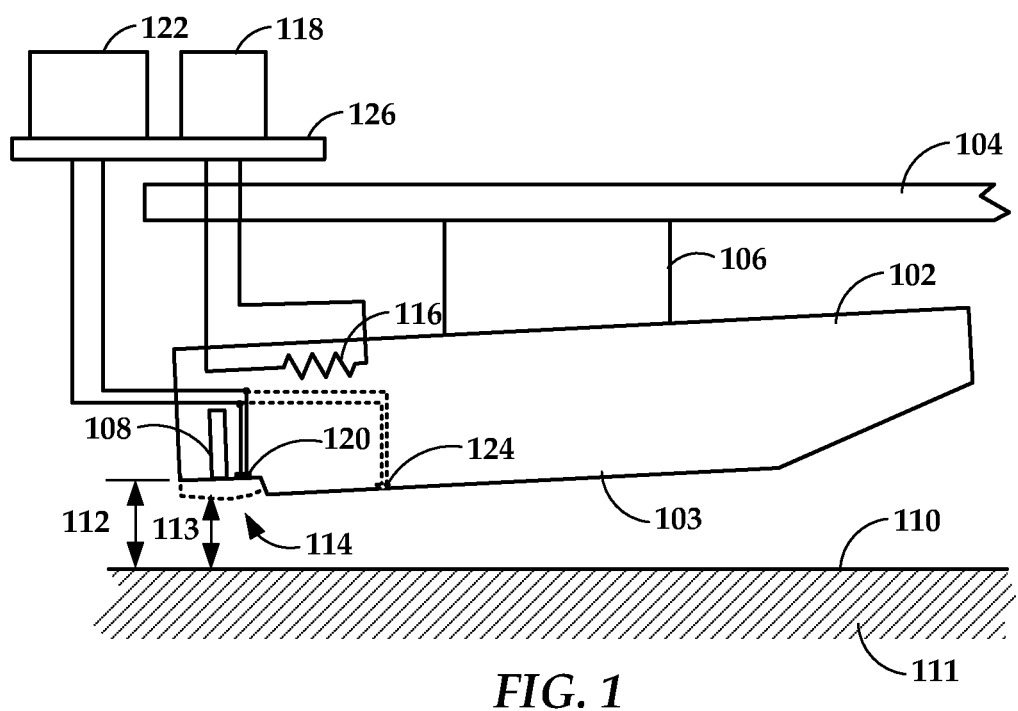
FIG. 1 is a block diagram of a hard drive slider and media arrangement according to an example embodiment.

In reference now to FIG. 1, a block diagram shows a side view of a magnetic sensor/writer employed in a slider 102 according to an example embodiment. This slider 102 may be used as a read/write head of a data storage device, e.g., hard drive. As such, for purposes of this disclosure, the terms "slider" and "magnetic head" may be used interchangeably. The slider 102 is coupled to an arm 104 by way of a suspension 106 that allows some relative motion between the slider 102 and arm 104. The slider 102 includes read/write transducers 108 at a trailing edge that are held proximate to a surface 110 of a magnetic recording medium, e.g., disk 111. When the slider 102 is located over surface 110 of disk 111, a flying height 112 is maintained between the slider 102 and the surface 110 by a downward force of arm 104. This downward force is counterbalanced by an air cushion that exists between the surface 110 and an air bearing surface 103 of the slider 102 when the disk 111 is rotating.

It is desirable to maintain a predetermined slider flying height 112 over a range of disk rotational speeds during both reading and writing operations to ensure consistent performance. A region 114 is a "close point" of the slider 102, which is generally understood to be the closest point of contact between the slider 102 and the magnetic recording medium 111, and generally defines the head-to-media spacing 113. To account for both static and dynamic variations that may affect slider flying height 112, the slider 102 may be configured such that a region 114 of the slider 102 can be configurably adjusted during operation in order to finely adjust the head-to-media spacing 113. This is shown in FIG. 1 by dotted line that represents a change in geometry of the region 114. In this example, the geometry change may be induced, in whole or in part, by an increase or decrease in temperature of the region 114.

The ability to alter shape and deflection magnitude of region 114 in response to temperature change may be due, e.g., to the region 114 being formed from a different material than other parts of the slider 102. In such a case, changes in temperature causes a deformation in this area 114 due to different thermal expansion properties of the respective materials. Selective application of heat to the slider 102 can be used to finely adjust the effective head-to-media spacing 113 of the transducers 108, e.g., as measured between the transducers 108 and media surface 110.

To provide this type of control over effective head-to-media spacing 113, the slider 102 may include (or otherwise be thermally coupled to) one or more heating elements 116. These heating elements 116 (e.g., resistance heaters) may be provided with selectable amounts of current by a control circuit 118. The control circuit 118 is coupled to the heating element(s) 116 via an interface 126, that may include physical and electrical conductive paths and connectors, as well as other active or passive circuitry (e.g., noise filters)

The heating element 116 can be mounted at a variety of locations (e.g., near region 114) and in a manner that minimizes its influence on the aerodynamic properties of the slider. Other elements of the slider 102 may also provide heat besides or in addition to the heating element 116. For example, a write coil of the read/write transducer 108 may generate sufficient heat to cause configurable deformation of region 114. Also, non-thermal devices (e.g., piezo-electric devices) may also cause some deformation/deflection of the region 114 instead of or in addition to the heating element 116.

The slider 102 also includes a resistive temperature sensor 120 located at or proximate to region 114. This sensor 120 has a temperature coefficient of resistance (TCR) that enables high precision measurements of temperature (or temperature change) at the region 114, and so is sometimes referred to as a TCR sensor. The TCR sensor 120 is coupled to sensor circuitry 122 that communicates with the sensor 120. The sensor circuitry 122 may at least include a controller with logic circuitry to perform the functions described herein. The circuitry 122 may also include analog or digital circuits for functions such as signal conditioning, digital signal processing, etc. The circuitry 122 is shown coupled to the sensor 120 via interface 126, which may include some components (e.g., connectors) in common with heater control 118.

One or more other TCR sensors may be employed in the slider 102, as represented by sensor 124, which is also coupled to sensor circuitry 122. The sensor 124 is disposed in a physically separate location from sensor 120, can be wired separately from sensor 120 or together with sensor 120 (e.g., in series or parallel). One or both sensors 120, 124 may be located near the close point within region 114, or at some other location in proximity to the media surface 110.

The response of the sensor 120 may be used to sense contact with the media 111 and/or to detect head-to-media spacing 113 of the slider 102 during operation. For example, some existing contact detection techniques involve applying a DC bias to the sensor 120 and attempting to detect relative changes in resistance as power to the heater 116 is varied. As the close point region 114 comes into contact with the media surface 110, friction may generally cause an increase of the sensor resistance due to an increase in temperature. However, DC resistance measurements are sensitive to noise, and it may require a large number of samples before DC resistance can be estimated. This may make the response of the system unacceptably slow. Also, the sensitivity of this technique may significantly depend on the actuation efficiency of the heater 116, which can make it more difficult to consistently set contact threshold over changes in air bearing conditions. For example, a difference in contact response between air bearing designs might purely be from efficiency differences between the heaters.

Another contact detection technique involves measuring root-mean-squared (RMS) power of the sensed resistance (or voltage) readings of the sensor 120. Mechanical and thermal perturbations occur in the region 114 due to slider-to-disk contact, and these perturbations can be detected in the form of a signature (e.g., an increase) in the RMS value of the sensor output.

This disclosure describes methods and apparatuses that address issues related to existing resistance-based contact detection methods. For example, currently-implemented contact detection techniques described above may be sensitive to the location of the resistance element relative to point on the slider that contacts the disk. Because of this location sensitivity, such techniques may not perform acceptably for designs that have dual heaters with different close points. The embodiments described herein work with dual heaters each associated with read/write elements and/or different close points. For example, each heater may have an associated close point (e.g., read sensor and write transducer) and the sensor may be located away from one or both of the associated close points, yet still be used to detect clearance/spacing. The embodiments may also work at a variety of skew angles and do not rely on modulation of the sensor signal to declare contact.

In one of these currently-implemented contact detection methods, power is applied to the heater 116 with a steady or DC waveform. The amplitude of the DC waveform is gradually increased to bring the slider into contact with the disk. Contact can be determined by measuring the induced vibrations from contact the head with the disk or by a sudden resistance change due to changing thermal boundary conditions.

Figure 2:
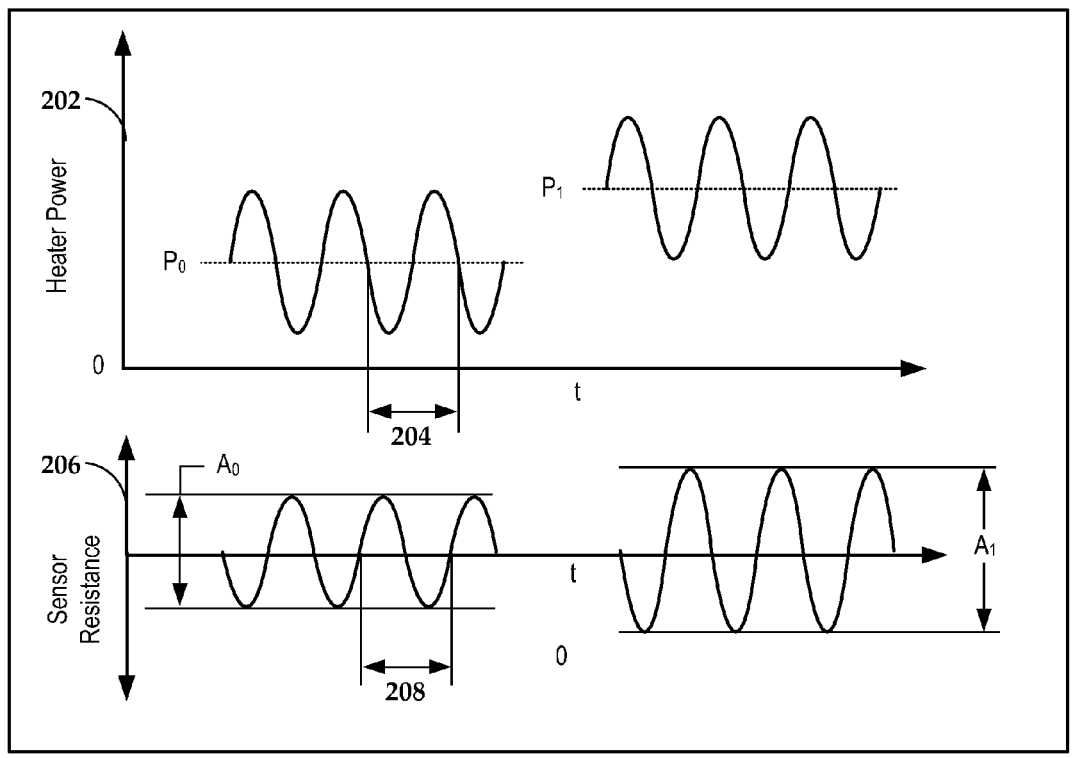
FIG. 2 is a graph showing heater power and response of a resistive sensor according to an example embodiment.

In reference to FIG. 2, graphs illustrate applied heater power and resulting sensor responses according to an example embodiment. As shown in graph 202, a DC power signal is AC-modulated with a sine wave. The graph shows to DC offset power levels, $P_0$ and $P_1$. In this example, the peak-to-peak amplitude of the sine wave does not change for the different power levels DC offset $P_0$, $P_1$. These input signals may be formed by combining a high frequency (10 kHz to 70 kHz) AC waveform of constant amplitude with the DC waveform. The frequency, indicated here by wavelength 204, is also constant at the different DC offset power levels $P_0$, $P_1$.

In graph 206, an AC component of a slider-mounted, thermal coefficient of resistance (TCR) sensor is shown. This output signal corresponds to the two heater power levels $P_0$, $P_1$ shown in graph 202, and is extracted at a frequency (indicated by wavelength 208) that is the same as that of the input waveform. The TCR sensor responds with a resistance change at the same frequency as the AC component of the heater power, indicated here by amplitudes $A_0$ and $A_1$. It will be appreciated that the total sensor output may include a DC offset, as well as other components (e.g., noise), and graph 206 is intended to represent only an AC component at the frequency 208 of interest that is extracted (e.g., filtered) for purposes of determining slider fly height.

As indicated in graph 206, the magnitude of the resistance changes from amplitude $A_0$ and $A_1$ in response to the changes in heater power. Although graph 206 shows the amplitude increase in response to increasing heater power, it may also decrease in response to increasing heater power. This may be due to whether the sensor has a positive or negative TCR, and other conditions that influence heat transfer proximate the sensor. For example, increasing the heater power increases thermal energy delivered to the sensor, but also brings the resistance element closer to the disk. This closer proximity to the disk changes the heat transfer boundary conditions, and may impact the ultimate resistance of the element used to measure the signals shown in graph 206. As a result, while increases in heater power may generally cause an increase in temperature in parts of the slider, the TCR sensor may see a decrease in temperature due to heat transfer effects (e.g., increase conductivity) of head-to-disk contact.

The resistance change occurring at the frequency of AC-modulated power can be measured in the frequency domain. For example, digital signal processing (DSP) circuits are widely available that can transform signals from time to frequency domains using, e.g., fast Fourier transform (FFT). In contrast, DC-only methods may be may be more difficult to implement in a disk drive due to the complexity of the required circuits.

Figure 3:
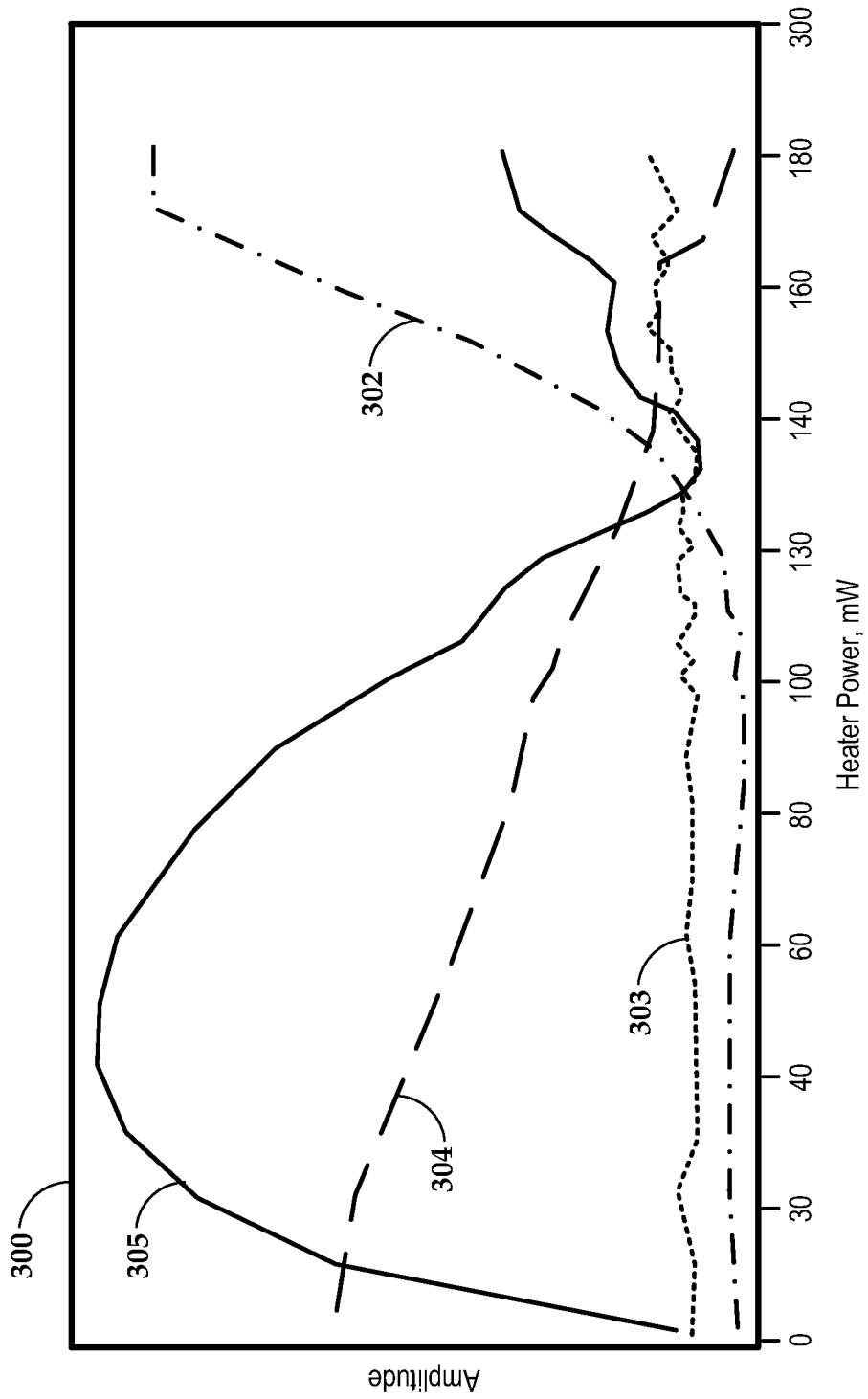
FIG. 3 is a graph illustrating example measurements of a slider according to an example embodiment

In reference now to FIG. 3, a graph 300 illustrates measurements of a slider according to an example embodiment. Generally, the graph 300 includes a number of measurements taken from a slider assembly at different levels of heater power (the horizontal axis). The vertical axis indicates signal amplitudes of traces 302-305. It should be noted that the traces 302-305 may be expressed in different units and scales from one another, and are presented to illustrate general trends of various types of measurement.

Trace 302 is a measure of the static friction between the head and the disk. This trace 302 shows the onset of contact at approximately 120 mW of heater power, with friction increasing steadily up to about 170 mW. Above 170 mW, the friction levels off indicating maximum/full contact between head and disk. Trace 303 is a conventional measurement of induced vibrations of the slider. Trace 304 is the conventional, DC resistance change of a TCR sensor. Note that this trace 304 decreases at a relatively constant slope up until about 140 mW. The trace 204 changes slope at both 140 mW and 160 mW in response to contact-induced conductivity changes proximate the TCR sensor.

Trace 305 in FIG. 3 is the amplitude of TCR sensor resistance change measured in the frequency domain at the frequency of the AC waveform modulated onto the heater voltage/current. This trace 305 has more variable change in slope through the range than seen in curve 304. Trace 305 also shows a clear change at the point of contact that can be used as the contact signature. For example, at around 120 mW, the trace 305 has a point of inflection where the curvature of the trace 305 changes sign. At a local minima around 135 mW, the slope changes from negative to positive. These changes in the trend and direction of the slope can be detected (e.g., by looking a first derivative of the trace 305 as a function of heater power). In this example, trace 305 provides a fairly accurate and detectable representation of contact, e.g., as represented by physical friction measurements shown in trace 302. Relative to trace 305, the DC trace 304 exhibits a relatively weak and late signature of contact.

The amplitude of resistance change seen in trace 305 exhibits a detectable change at the point of contact. While the shape of this trace 305 may be applicable to the configuration illustrated, it will be appreciated that alternate curves/trends may also be used as a signature of head-to-disk contact. For example, any inflection points or local extremum (e.g., minimum or maximum) of the resistance itself, or derivatives thereof may indicate head-to-disk contact. These signatures can be detected and used to set the desired operating clearance of the head-gimbal assembly (HGA). For example, the value and slope of the trace 305 may also be used to determine fly height clearances and/or head-to-media spacing. This type of clearance detection may not require the resistance element be at the close point and thus works well with dual heater HGAs. This type of clearance detection does not require high levels of advance air bearing (AAB) modulation.

It will be appreciated that the embodiments described above may include many variations. For example, a slider may include two or more heaters, e.g., one for controlling height of a magnetic reader and another for controlling the height of a magnetic writer. A TCR sensor may be employed to operate with one or both heaters at the same or different times. In one variation, the heaters may be modulated with different frequency waveforms, so that two different frequency domain outputs of the TCR sensor can be analyzed. Similarly, multiple TCR sensors may be used, either wired separately or coupled together in parallel and/or series with one another. Signals from these sensors can analyzed separately or combined together as their coupling allows.

Figure 4:
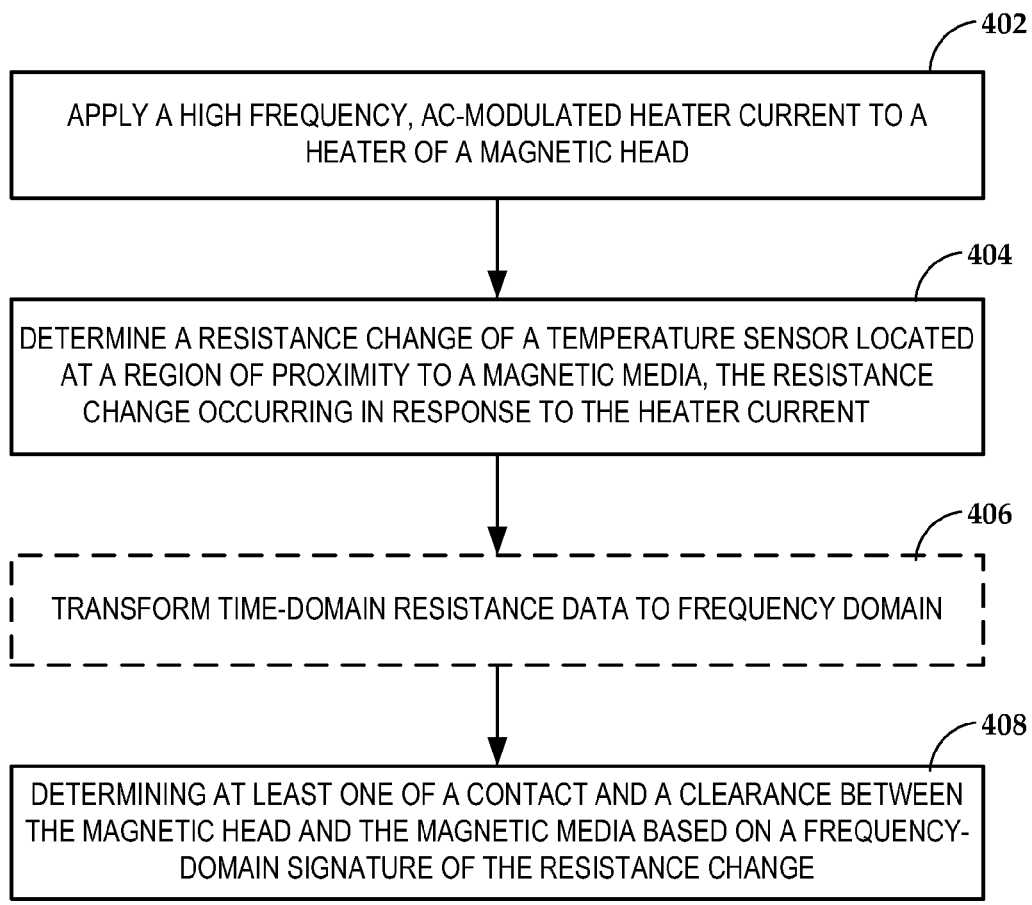
FIG. 4 is a flowchart illustrating a procedure according to an example embodiment.

In reference now to FIG. 4, a flowchart illustrates a procedure according to an example embodiment. The procedure involves applying 402 a high frequency, AC-modulated heater current to a heater of a magnetic head. The heater may be configured to adjust a spacing between the magnetic head and the media. The high frequency, AC-modulated heater current may include a DC offset, the DC offset being varied to adjust the spacing.

A resistance change of a temperature sensor located at a region of proximity to a magnetic media is determined 404. The resistance change occurs in response to the heater current. This resistance data may optionally be transformed 406 from the time domain to frequency domain. At least one of a contact and a clearance/spacing between the magnetic head and the magnetic media is determined 408 based on a frequency-domain signature of the resistance change. The frequency domain signature may be measured at the frequency of the heater current. The frequency-domain signature may include a local extremum and/or inflection point of the resistance measured in the frequency-domain. In such a case, the local extremum and/or inflection point occurs in response to the contact between the magnetic head and the media.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
applying a high frequency, AC-modulated DC heater current to a heater of a magnetic head;
determining a resistance change of a temperature sensor that is separate from the heater and located at a region of proximity to a magnetic media, the resistance change occurring in response to the heater current; and
determining a spacing between the magnetic head and the magnetic media based on a frequency-domain signature of the resistance change.

2. The method of claim 1, wherein the heater is configured to adjust the spacing between the magnetic head and the magnetic media.

3. The method of claim 2, wherein a DC offset of the high frequency, AC-modulated DC heater current is varied to adjust the spacing.

4. The method of claim 2, wherein the temperature sensor is located away from a close point associated with the heater.

5. The method of claim 1, wherein the heater current is modulated at or above 10 kHz.

6. The method of claim 1, further comprising applying a second high frequency, AC-modulated DC heater current to a second heater of the magnetic head at a different frequency than a frequency of the heater current, wherein the spacing is determined based on analyzing different frequency domain outputs at the frequency of the heater current and the different frequency of the second heater.

7. The method of claim 1, wherein the frequency-domain signature comprises at least one of a local extremum and an inflection point of the resistance measured in the frequency-domain, at least one of the local extremum and the inflection point occurring in response to the contact between the magnetic head and the magnetic media.

8. A magnetic head comprising:
at least one heater configured to adjust a spacing between the magnetic head and a magnetic media;
a temperature sensor that is separate from the at least one heater and located at a region of proximity to the magnetic media; and
a controller interface coupled to the heater and the temperature sensor and configured to facilitate:
applying a high frequency, AC-modulated DC heater current to the heater;
determining a resistance change of the temperature sensor in response to the heater current; and
determining a spacing between the magnetic head and the magnetic media based on a frequency-domain signature of the resistance change.

9. The magnetic head of claim 8, wherein a DC offset of the high frequency, AC-modulated DC heater current is varied to adjust the spacing.

10. The magnetic head of claim 8, further comprising a second heater, wherein the controller applies a second high frequency, AC-modulated DC heater current to the second heater at a different frequency than a frequency of the heater current, wherein the spacing is determined based on analyzing different frequency outputs at the frequency of the heater current and the different frequency of the second heater.

11. The magnetic head of claim 8, wherein the heater current is modulated at or above 10 kHz.

12. The magnetic head of claim 8, wherein the frequency domain signature is measured at the frequency of the heater current.

13. The magnetic head of claim 8, wherein the frequency-domain signature comprises at least one of a local extremum and an inflection point of the resistance measured in the frequency-domain, at least one of the local extremum and the inflection point occurring in response to the contact between the magnetic head and the magnetic media.

14. An apparatus comprising:
a magnetic media;
a magnetic head having at least one heater configured to adjust a spacing between the magnetic head and the magnetic media;
a temperature sensor that is separate from the at least one heater and located at a region of proximity to the magnetic media; and
a controller coupled to the magnetic head and configured to:
apply a high frequency, AC-modulated DC heater current to the heater;
determine a resistance change of the temperature sensor in response to the heater current; and
determine a spacing between the magnetic head and the magnetic media based on a frequency-domain signature of the resistance change.

15. The apparatus of claim 14, wherein a DC offset of the high frequency, AC-modulated DC heater current is varied to adjust the spacing.

16. The apparatus of claim 14, wherein the heater current is modulated at or above 10 kHz.

17. The apparatus of claim 14, further comprising a second heater, wherein the controller applies a second high frequency, AC-modulated DC heater current to the second heater at a different frequency than a frequency of the heater current, wherein the spacing is determined based on analyzing different frequency outputs at the frequency of the heater current and the different frequency of the second heater.

18. The apparatus of claim 14, wherein the frequency-domain signature comprises at least one of a local extremum and an inflection point of the resistance measured in the frequency-domain, at least one of the local extremum and the inflection point occurring in response to the contact between the magnetic head and the magnetic media.

* * * * *